(12) United States Patent
Celinder et al.

(10) Patent No.: US 9,844,956 B2
(45) Date of Patent: Dec. 19, 2017

(54) PRINT POSITION CORRECTION

(71) Applicant: Intermec Technologies Corporation, Fort Mill, SC (US)

(72) Inventors: Thomas Axel Jonas Celinder, Singapore (SG); Chia Kiang Sum, Singapore (SG)

(73) Assignee: Intermec Technologies Corporation, Fort Mill, SC (US)

( * ) Notice: Subject to any disclaimer, the term of this patent is extended or adjusted under 35 U.S.C. 154(b) by 0 days.

(21) Appl. No.: 14/877,128

(22) Filed: Oct. 7, 2015

(65) Prior Publication Data
US 2017/0100949 A1   Apr. 13, 2017

(51) Int. Cl.
*B41J 11/00* (2006.01)
*B41J 25/00* (2006.01)
*G06K 19/06* (2006.01)
*B41J 3/407* (2006.01)

(52) U.S. Cl.
CPC ........... *B41J 11/008* (2013.01); *B41J 25/001* (2013.01); *G06K 19/06028* (2013.01); *G06K 19/06037* (2013.01); *B41J 3/4075* (2013.01)

(58) Field of Classification Search
CPC .................................................... B41J 11/008
See application file for complete search history.

(56) References Cited

U.S. PATENT DOCUMENTS

| | | | |
|---|---|---|---|
| 6,367,996 B1 * | 4/2002 | Edwards | B41J 13/0027 400/279 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |

(Continued)

FOREIGN PATENT DOCUMENTS

| | | |
|---|---|---|
| JP | 62273875 A * | 11/1987 |
| JP | 07329360 A * | 12/1995 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Daniel J Colilla
(74) *Attorney, Agent, or Firm* — Addition, Higgins & Pendleton, P.A.

(57) ABSTRACT

A system and method for printing an indicia on a graphic medium is described. A print mechanism is operable for marking multiple printouts of the indicia at a target position on the graphic medium, and for outputting a printed media product. The printed media product has a first output group of the marked printouts, and continuous with the output of the first group of printouts, at least one output group of the printouts marked subsequent to the first output group. A controller is operable for adjusting the print mechanism in response to an input related to an evaluation of the printouts marked on the first output group. The adjustment conforms a position at which the printouts are marked in the at least one subsequent output group spatially to the target position.

19 Claims, 13 Drawing Sheets

(56) References Cited

U.S. PATENT DOCUMENTS

| | | |
|---|---|---|
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |

(56) References Cited

U.S. PATENT DOCUMENTS

| | | |
|---|---|---|
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2004/0083915 A1* | 5/2004 | Michaelson .............. B41J 13/00 101/484 |
| 2005/0078133 A1* | 4/2005 | Molinet ................. B41J 2/2139 347/12 |
| 2007/0063048 A1 | 3/2007 | Havens et al. |
| 2009/0134221 A1 | 5/2009 | Zhu et al. |
| 2010/0078870 A1* | 4/2010 | Fellingham ............ B41J 2/2132 271/8.1 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |

(56) References Cited

U.S. PATENT DOCUMENTS

| | | |
|---|---|---|
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0268207 A1* | 9/2014 | Fukase .................. G06K 15/027 358/1.14 |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009262 A1 | 1/2015 | Bell et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116413 A1* | 4/2015 | Duke .................... B41J 29/393 347/19 |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2013163789 A1 | 11/2013 |
| WO | 2013173985 A1 | 11/2013 |

(56) References Cited

FOREIGN PATENT DOCUMENTS

| WO | 2014019130 A1 | 2/2014 |
|----|---------------|--------|
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for CYCLONE filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Extended European Search Report in counterpart EP Application No. 16192710.8 dated Mar. 15, 2017, pp. 1-7.

\* cited by examiner

EXAMPLE PRINTING METHOD USE 210

EXAMPLE PRINTING METHOD USED 220

EXAMPLE CENTERED PRINTOUT 333

EXAMPLE OFF-CENTER PRINTOUT 399

EXAMPLE 'SMALL' LABEL 40

EXAMPLE SMALL LABEL 40, E.G., IN SITU

EXAMPLE 1D 'DRAG' MODE MEDIA PRODUCT 61

EXAMPLE 1D 'PICKET FENCE' MODE MEDIA PRODUCT 62

EXAMPLE 2D MEDIA PRODUCT 63

EXAMPLE TEXT BASED MEDIA PRODUCT 64

PRINT POSITION CORRECTION

TECHNOLOGY FIELD

The present invention relates generally to printing. More particularly, example embodiments of the present invention relate to correcting positions for the printing of indicia.

BACKGROUND

Generally speaking, graphic media products comprise symbols, barcodes, text, and other indicia, which may be marked on a blank media substrate by a variety of printing systems. As used herein, the term "blank" may refer to a substantially unmarked substrate of the print medium. The print medium may comprise paper, plastic, and/or other markable materials. For example, a printing system may mark paper based print media with an ink based marking material. The print system may comprise a media feeding mechanism and a media marking mechanism. As used herein, the term "mechanism" may refer to a functional component of a printer system ("printer").

The feed mechanism is operable for feeding, providing or supplying ("feeding") a supply of the blank media substrate to the print mechanism. The feed mechanism may be operable using a force applied by traction, or by another impetus. The print mechanism may comprise a print head, which is operable for marking the barcode, text, or other indicia onto the blank medium as it is moved into proximity therewith. The unmarked medium may be placed into proximity with the print head with a platen, roller, gear, or other assembly, which may comprise a component of the feed mechanism (and/or of the print head, itself).

Prior to being fed into proximity with the printhead, the blank medium substrate may be stored in a rolled configuration, which is disposed on a spool for presentation to the feed mechanism. Other media storage configurations may also (or alternatively) be used. For example, the blank media may comprise a plurality of individual flat planar sections folded in alternate directions, relative to each other, and arranged into an "accordion" like configuration. The accordioned sections may be stored within a magazine, bin, box, or other storage container associated with the feed mechanism. The individual sections are unfolded as the medium is fed into the printer.

Various printers are operable for marking media comprising other correspondingly compatible materials. For example, blank print media used with thermal printers may comprise a thermal marking ribbon and an associated thermally-markable media substrate, which may be stored together on the roll, spool, or folded-feed magazines for supply to a thermally operable printhead. The thermal printhead is operable for heating a portion of the area of the blank print medium substrate corresponding to a target (e.g., programmatically controlled or specified) location at which a symbol or other portion of the barcode, text, or other indicia is to be printed. A visible marking material is transferred from the thermal marking ribbon to the locally heated portion of the medium substrate.

Light emitting print heads may mark photosensitive media photographically. For example, some lasers printheads may be operable for marking media substrates comprising metallic and/or other materials by etching associated with controlled deposition of high optical energy and related localized thermal effects. Some other laser printheads may be used, in fact, to print encoded data patterns on media substrate layers corresponding to optically-encodable layers of a computer readable storage medium, such as a Compact Disk (CD), Digital Versatile (or 'Video') Disk (DVD), Blu-ray Disk (BD), and/or other optically readable media.

Some other print heads may also be operable for etching, or otherwise marking media surfaces chemically. For example, the print heads may controllably deposit chemical etching agents ("etchants"), such as solvents or acids, over localized portions of acid-sensitive media substrates, or a bleaching agent ("bleach") over bleach-sensitive media substrates.

Upon the printing of the graphic media product, the individual unfolded sections, or sequential portions of roller-fed media, may be singulated by cutting, tearing, or another separation technique into individual printed media products. The individual printed media products are thus separated from the remaining blank media supply (or a subsequent, sequential, and/or incompletely-printed section or portion thereof). The singulated printed media products may comprise labels.

The labels may be applied, affixed, and/or attached ("applied") to an item to provide information. The information may comprise, for example, identification, characterization, warnings, and/or other data related to, or associated with the item to which the label is applied. Contemporary media products comprise small labels, or larger labels that have small margins.

As used herein, the term "small labels" may refer to two dimensional (2D) labels with at least one spatial dimension that measures less than a corresponding dimension of an item on which the label is to be affixed, applied, and/or attached. As used herein, the term "larger labels" may refer to 2D labels with at least one spatial dimension that measures more than a corresponding dimension of a small label. As used herein, the term "small margins" may refer to a substantially non-printed, and/or graphically blank and/or null area disposed about, around, bordering, circumscribing, delineating, and/or peripheral to an area of the labels covered substantially by the printed barcodes, text, or other indicia.

The small labels may be intended to be applied to items such as, for example, small containers used for dispensing medicines, which may comprise narcotics, radiopharmaceuticals and other therapeutic or diagnostic drugs. As such, the labels may be applied to the items for the purpose of providing important information to users of the item. The information may relate to the safe use of the items and/or precautions, "side-effects," hazards, and/or dangers associated with using the item. In such uses, the print quality specifications may comprise significant rigor with respect to strictures for heightened levels of precision related to the uniformity with which the markings are applied to the specified target positions.

The print quality specifications may thus comprise significant rigor with respect to strictures for heightened levels of precision related to the uniformity with which the markings are applied to the specified target positions. The heightened strictures may also apply to some of the larger labels with small margins. For example, the larger labels may be intended for application to "high end" items with fine external appearances or other heightened aesthetic characteristics.

However, contemporary printers may tend to drift the position of a printout of the text, barcodes, or other indicia marked on the print medium. This 'print position drift' comprises a change in a position at which the printout is marked on the print medium, relative to the position at which a corresponding printout is marked on a previous label other product, or to a programmed, preferred, specified, or target ("specified target") position on the surface area of the print medium at which the barcode, text, or other indicia is thus intended to be printed.

The print position drift can lead to a visibly perceivable non-uniformity between individual labels and other printed media products, which may be specified to conform to a uniform printed configuration. For example, the uniform printed configuration may be specified to consistently, repeatedly, and/or continuously mark the printout at the specified target position with an allowable level of precision. Non-uniform labels produced as a result of the print position drift may fail to conform to the specified uniform printed configuration and a related print quality specification.

The print position drift may be caused by changes in the amount of the print medium remaining in a media storage magazine over time, which changes mechanical forces associated with the printer mechanism. For example, as the print mechanism operates over time, the blank print medium is consumed in production of the labels or other printed media products. As the blank print medium is consumed, its remaining mass is diminished over the printer operating time and thus, comprises less weight to be moved by, and/or exerts less drag on, a component of the feed mechanism.

Some contemporary printers implement a mechanical approach to addressing the quality issues posed by the print position drift. For example, the 'Intermec-3240'™ printer (commercially available from Honeywell™ International, a corporation in New Jersey) comprises a mechanical feature, with which an operator may attempt to re-adjust the position of the printout over a successive printing of increasing numbers of labels and/or other printing products from the roll or other media substrate supply. As used herein, the term "operator" may refer to (a) user(s) of the printer system.

However, the mechanical features with which the operator may implement the adjustments add both cost and complexity to the printer systems, and may introduce associated reliability and maintenance issues, with additional associated costs. Moreover, such features may focus the ongoing attention of the operator upon monitoring the position of the printouts over at least significant portions of the duration of the printing. As such, the operator's attention may thus be directed away from other significant activities, endeavors, jobs, opportunities, and/or tasks, with even further associated expenses.

It could be useful, therefore, to adjust the print position on a label during a printing of a sequence or other plurality of labels or other printed media products. It would also be useful to control or direct the printing of each of the labels (or other printed media products) "properly," relative to an intended, or specified target printed configuration, and/or in conformance with a quality specification. Further, it would be useful to adjust the printing, and to control or direct the printing quality of the labels (or other printed media products) without requiring modification of print job data streams, interruption of ongoing production processes, and/or without demanding undo focus of operator attention or an intervention by an administrator.

SUMMARY

Accordingly, in one aspect, an example embodiment of the present invention relates to a method for adjusting a print position on a label during a printing of a sequence or other plurality of labels or other printed media products ("labels").

An example embodiment of the present invention also relates to exerting control over a direction of the printing of each of the labels, relative to an intended and/or specified target printed configuration, and/or in conformance with a print related quality specification.

Further, an example embodiment of the present invention relates to adjusting the printing, and to controlling and/or directing the printing quality without modifying print job data streams, interrupting ongoing production processes, and/or without undo focus of operator attention or an intervention by an administrator.

An example embodiment of the present invention relates to a system for printing an indicia on a graphic medium. The printing system comprises a print mechanism and a controller. The print mechanism is operable for marking a plurality of printouts of the indicia at a target position on the graphic medium, and for outputting a corresponding printed media product. The printed media product comprises a first output group of the marked printouts, and continuous with the output of the first group of printouts, at least one output group of the printouts marked subsequent to the first output group. The controller is operable for adjusting the print mechanism in response to an input related to an evaluation of the printouts marked on the first output group. The adjusting of the print mechanism conforms a position at which the printouts are marked in the at least one subsequent output group spatially to the target position.

An example embodiment of the present invention relates to a method for printing. The method comprises a process performed by the printing system, summarized above.

An example embodiment of the present invention relates to a media product comprising an indicia printed on a graphic medium. The media product is printed by the method summarized above.

Embodiments of the present invention are thus useful, for example, in printing small labels, and labels upon which the text, barcodes, and/or other graphics or indicia that fill most of the area of the label, which has a small margin. Example embodiments of the present invention may also thus reduce waste related to improper, non-conforming, or otherwise defective labels, and thus avoid associated delays and corresponding expense. Further, example embodiments of the present invention may thus prevent or reduce delays in the print jobs and associated printing system downtime, diversions of operator attention ore administrator intervention, and costs associated with both.

The foregoing illustrative summary, as well as other example features, functions and/or aspects of embodiments of the invention, and the manner in which the same are accomplished, are further explained within the following detailed description of example embodiments and each figure ("FIG.") of the accompanying drawings.

DESCRIPTION OF EXAMPLE EMBODIMENTS

Figure 1:
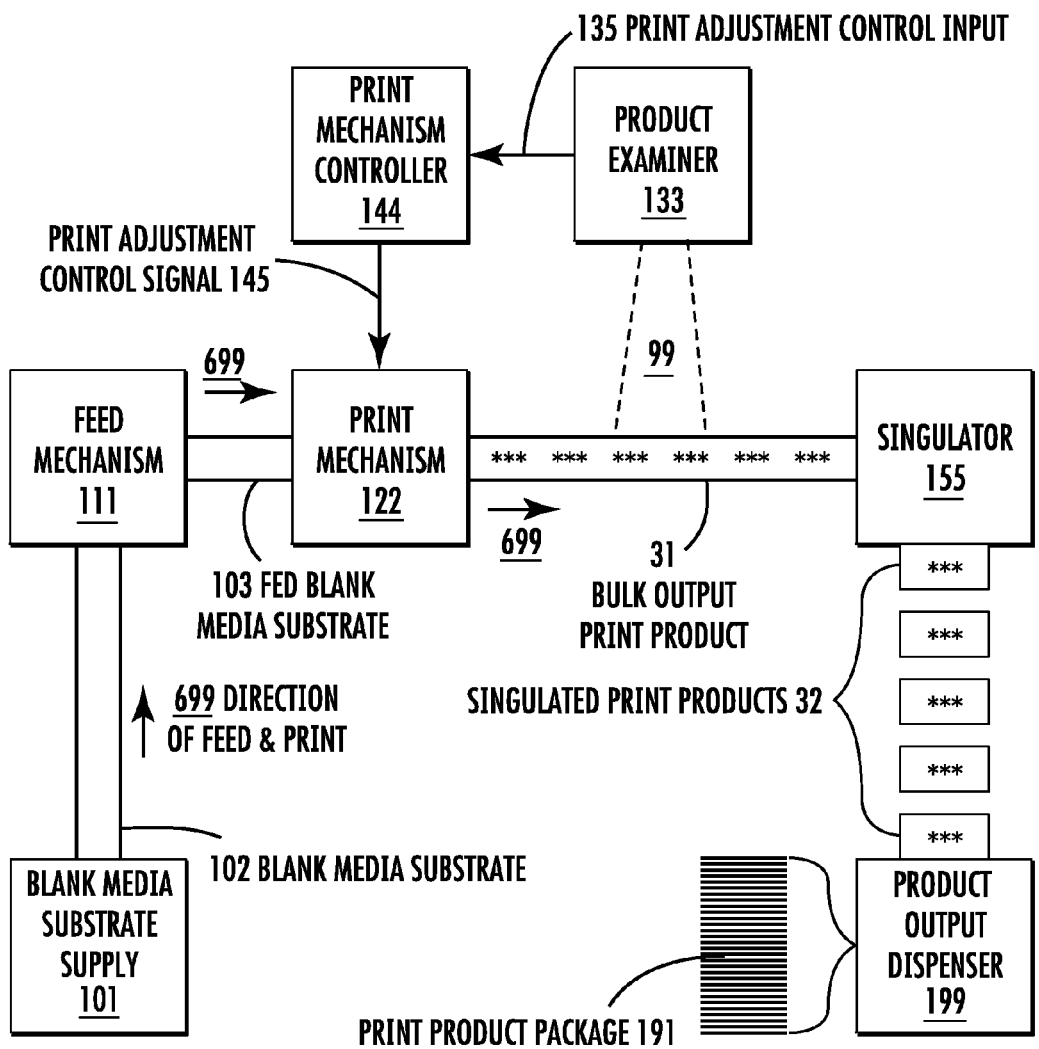
FIG. 1 depicts a flowchart of an example printing system, according to an embodiment of the present invention.

Example embodiments of the present invention are described in relation to systems and methods for printing an indicia on a graphic medium. In an example embodiment, a system for printing the indicia on the graphic medium comprises a print mechanism and a controller. The printing system comprises a print mechanism and a controller. The print mechanism is operable for marking a plurality of printouts of the indicia at a target position on the graphic medium, and for outputting a corresponding printed media product. The printed media product comprises a first output group of the marked printouts, and continuous with the output of the first group of printouts, at least one output group of the printouts marked subsequent to the first output group. The controller is operable for adjusting the print mechanism in response to an input related to an evaluation of the printouts marked on the first output group. The adjusting of the print mechanism conforms a position at which the printouts are marked in the at least one subsequent output group spatially to the target position.

Embodiments of the present invention may thus be useful, for example, in printing small labels, and labels upon which the text, barcodes, and/or other graphics or indicia that fill most of the area of the label, which has a small margin. Example embodiments of the present invention may also thus reduce waste related to improper, non-conforming, or otherwise defective labels, and thus avoid associated delays and corresponding expense. Further, example embodiments of the present invention may thus prevent or reduce delays in the print jobs and associated printing system downtime, diversions of operator attention ore administrator intervention, and costs associated with both.

Overview.

An example embodiment of the present invention relates to a system for printing an indicia on a graphic medium. The printing system comprises a print mechanism and a controller. The printing system comprises a print mechanism and a controller. The print mechanism is operable for marking a plurality of printouts of the indicia at a target position on the graphic medium, and for outputting a corresponding printed media product. The printed media product comprises a first output group of the marked printouts, and continuous with the output of the first group of printouts, at least one output group of the printouts marked subsequent to the first output group. The controller is operable for adjusting the print mechanism in response to an input related to an evaluation of the printouts marked on the first output group. The adjusting of the print mechanism conforms a position at which the printouts are marked in the at least one subsequent output group spatially to the target position.

The target position may comprise an area of a surface of a substrate of the graphic medium over which the marking is designated for each of the printouts. The graphic medium substrate comprises a first edge and a second edge, the second edge parallel to and opposite from the first edge. The area of the target position comprises an upper bound separated by a first designated distance from the first edge of the graphic medium substrate, and/or a lower bound separated by a second designated distance from the first edge of the graphic medium substrate.

The system may further comprise a feed mechanism operable for supplying the graphic medium substrate to the print mechanism. The adjusting of the print mechanism may comprise a response to a change in an operating characteristic of the feed mechanism.

The printed media product may comprise a plurality of labels. The indicia may comprise one or more symbols. For example, the symbols may comprise text based information, and/or ideographic, pictographic, or emblematic based graphics, images, or data patterns. The indicia may comprise a one dimensional (1D) data pattern such as a bar code, or a two dimensional (2D) data pattern such as a matrix code.

An example embodiment may be implemented in which the system comprises a graphical user interface (GUI) operable for inputting a signal relating to the evaluation of the printouts marked on the first output group. The GUI is further operable for displaying an indication relating to the adjusting of the print mechanism. For example, the indication may relate to a degree of adjustment corresponding to the adjusting of the print mechanism.

An example embodiment of the present invention relates to a method for printing an indicia on a graphic medium. The printing method may comprise a process of the printing system described above.

The printing method comprises marking a plurality of printouts of the indicia at a target position on a substrate of the graphic medium. The target position comprises an area of a surface of the substrate of the graphic medium over which the marking is designated for each of the printouts. A first output group of the marked printouts is produced (e.g., outputted). Upon the outputting of the first output group of the marked printouts, and continuous therewith (e.g., without any intermediary pause), at least one output group of the printouts is produced, which is marked subsequent to the first output group. The marking of the printouts of the indicia is adjusted in response to an input, which is based on an evaluation of the printouts marked on the first output group. The adjustment relates to conforming a position at which the printouts are marked in the at least one subsequent output group, spatially, with the target position.

The graphic medium substrate comprises a first edge and a second edge. The second edge is parallel to, and opposite from the first edge. The area of the target position may comprise an upper bound separated by a first designated distance from the first edge of the graphic medium substrate, and/or a lower bound separated by a second designated distance from the first edge of the graphic medium substrate. The printing method may further comprise feeding the graphic medium substrate, e.g., to a print head, for the marking of the printouts of the indicia. The adjusting of the marking of the printouts may comprise a response to a change in a characteristic of the feeding of the graphic medium substrate.

An example embodiment of the present invention relates to a media product comprising an indicia printed on a graphic medium. The media product is printed by the method summarized above.

Example Printing System.

FIG. 1 depicts a flowchart of an example printing system 100, according to an embodiment of the present invention. The printing system 100 comprises a print mechanism 122 and a controller 144.

Figure 2A:
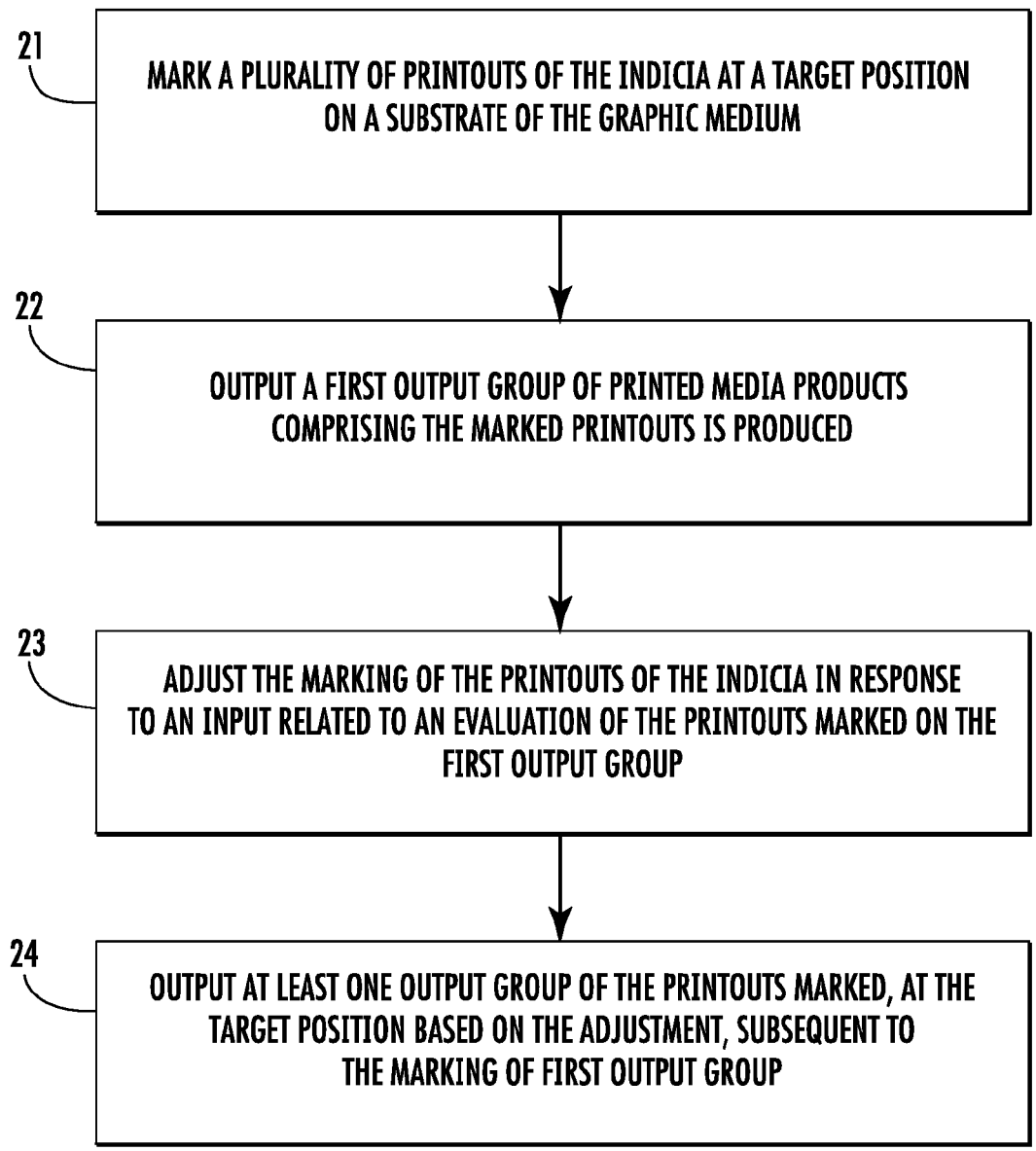
FIG. 2A depicts a flowchart for an example printing method, according to an embodiment of the present invention.

The print mechanism 122 is operable for marking a plurality of printouts of the indicia at a target position on the graphic medium 103, and for outputting a corresponding printed media product 31. The printed media product comprises a first output group of the marked printouts (e.g., printouts 221; FIG. 2C), and continuous with the output of the first group of printouts, at least one output group of the printouts (e.g., printouts 223; FIG. 2C) marked subsequent to the first output group.

The controller 144 is operable for adjusting the print mechanism 122 in response to an input 135, which relates to an evaluation of the printouts marked on the first output group. The controller 144 may output a print adjustment control signal 145 based on receipt of the input 135. The adjusting of the print mechanism conforms a position at which the printouts are marked in the at least one subsequent output group spatially in relation to the target position, responsive to the print mechanism 122 receiving the print adjustment control signal 145.

A substantially blank print media substrate 102 is supplied from a media storage 101. As used in this sense, the term "substantially blank" refers to the media substrate 102 comprising an unmarked state in relation to any printed indicia, except for any identifiers, descriptors, and/or "watermarks" or other security (or other) features, which if present, are intended to typically escape common perceptual notice not directed specifically thereto. The substantially blank media substrate comprises, in this sense, virgin media ready to be marked with the printed indicia.

The blank medium substrate 102 may be stored in a rolled configuration, which is disposed on a spool for presentation to the feed mechanism 111, or stored in another media storage modality 101, such as a magazine, bin, box, etc. An example embodiment may be implemented in which the blank media comprises a plurality of individual flat planar sections folded in alternate directions, relative to each other, and arranged into an "accordion" like configuration and unfolded as the medium is fed into the printer.

An example embodiment may be implemented in which the print medium substrate 102 comprises a thermally sensitive material, and the print mechanism 122 comprises a thermally operable ("thermal") printhead. The marking of the plurality of printouts of the indicia may thus comprise a thermal marking process or technique. For example, the thermal printhead may selectively heat specific points or regions of an area of the thermally sensitive media, which upon the heating, may be marked by a picture element (pixel) or other portion of the indicia.

The thermal media substrate may comprise a single layer of thermally sensitive paper or other material, which upon the heating changes from a light color or shade corresponding to the virgin media substrate to a darkened color or shade, or vice versa. For example, thermally sensitive material, upon the heating, may change from a dark color or shade corresponding to another virgin media substrate to a lightened color or shade. Alternatively, the thermal media substrate may comprise a base layer and a thermal transfer material, which transfers a mark onto the selectively heated surface of the substrate base layer.

An example embodiment may be implemented in which the print medium substrate comprises a paper material and/or a plastic material. The marking of the plurality of printouts of the indicia comprises marking the print medium substrate with a compatible marking agent or related material. For example, ink based marking agents may be compatible with paper based print medium substrates.

The printing system 100 may further comprise a feed mechanism 111 operable for supplying the graphic medium substrate 103 to the print mechanism 122. The adjusting of the print mechanism 122 may comprise a response to a change in an operating characteristic of the feed mechanism 111.

Upon the marking of the media substrate 103, the print mechanism 122 outputs a bulk output print product 31. A direction of feed and printing 699 applies to the movement of the substantially blank media substrate 102, the fed blank media substrate 103, and the bulk output media product 31, which may each comprise a continuous web or related configuration.

Figure 3A:
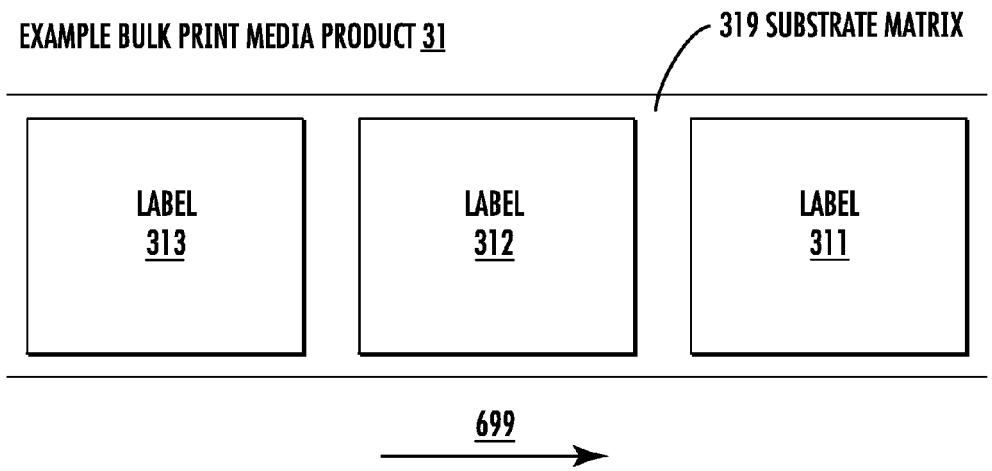
FIG. 3A depicts an example bulk print media product, according to an embodiment of the present invention.

FIG. 3A depicts an example bulk print media product 31, according to an embodiment of the present invention. The bulk output media product 31 may comprise a web or related configuration of printed labels 311, 312 and 313, which may represent any positive number of printed media products that is greater than one. The bulk media product 31 may be supplied to a singulator 155.

Figure 3B:
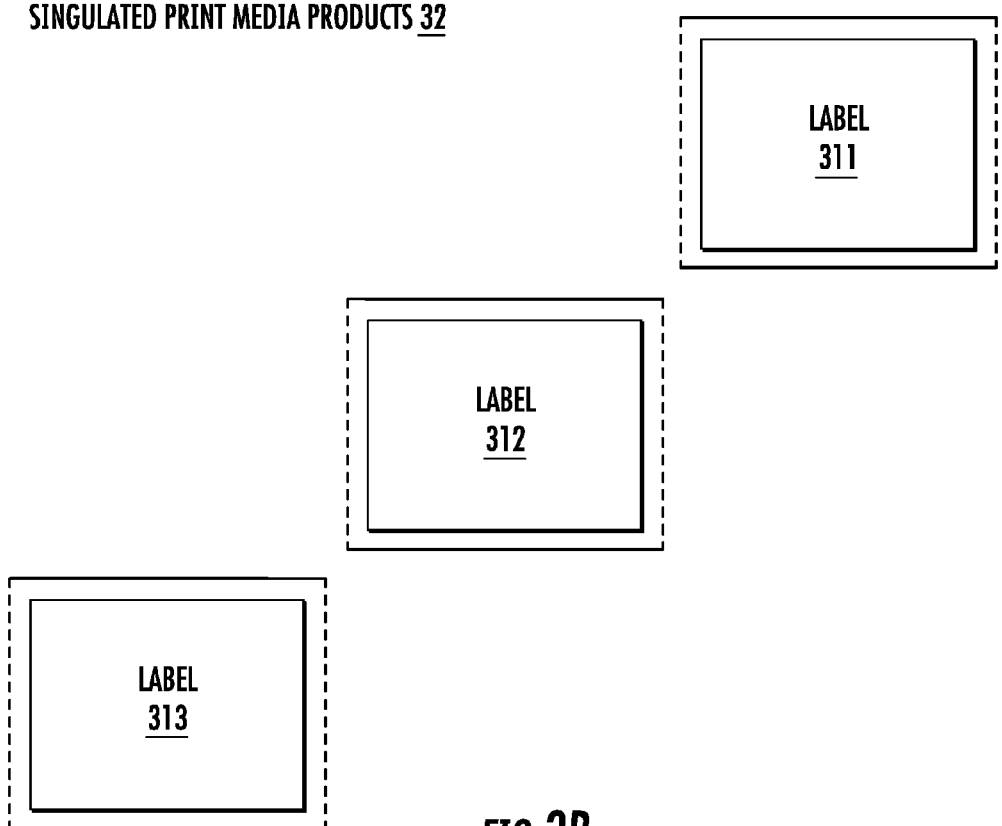
FIG. 3B depicts example singulated print media product, according to an embodiment of the present invention.

The singulator 155 is operable for singulating the bulk media product 31 into a plurality of separate printed media products 32, such as the individual labels 311, 312, and 313. FIG. 3B depicts example singulated print media products 32, according to an embodiment of the present invention.

The singulator may singulate the individual labels 311, 312 and 313 using cutting or tearing the substrate material of the bulk media product 31 (or by dissolving an insignificant portion of the substrate) along the abutting edges of each of the individual media products 311, 312, and 313. A product output dispenser 199 may then stack, bundle, and/or distribute the singulated printed media products as a package 191.

Figure 3C:
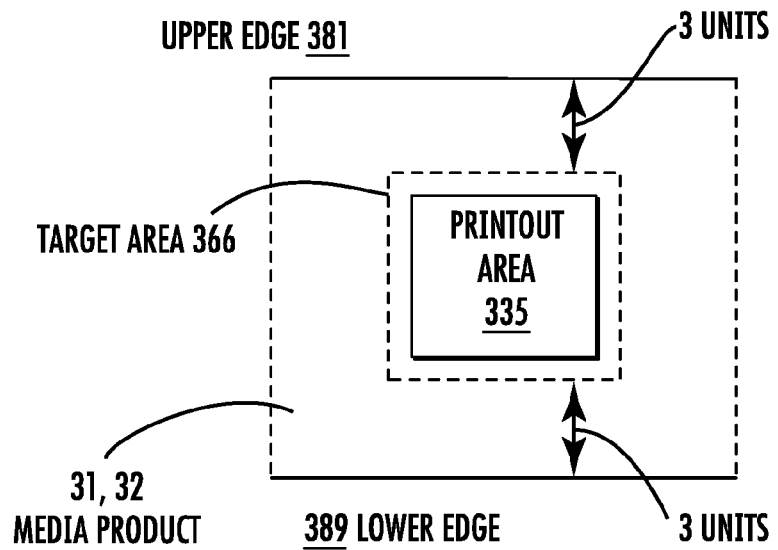
FIG. 3C depicts an example centered printout on the print media product, according to an embodiment of the present invention.

The target position may comprise an area of a surface of a substrate of the graphic medium over which the marking is designated for each of the printouts. FIG. 3C depicts an example centered printout 333 on the print media product, according to an embodiment of the present invention. The substrate of the graphic media products 31 and 32 comprises a first edge 381, and a second edge 389. The second edge 389 is parallel to and opposite from the first edge 381. Relative to the orientation of the indicia marked in the printout area 335, e.g., in which text symbols may be read (and/or graphic symbols observed) in a "right-side-up"

orientation, the first edge 381 may comprise an "upper" edge, and the second edge 389 may comprise a "lower" edge, of the media products 31 (and 32).

A target area 366 corresponds to (e.g., matches spatially, covered by) the target position comprises an upper bound separated by a first designated distance, e.g., three vertical displacement units, from the first edge 331 of the graphic medium substrate, and a lower bound separated by a second designated distance, e.g., also three vertical displacement units, from the first edge of the graphic medium substrate. In the centered printout 333, the printout 335 is positioned on, over, or within the target area 366. As used herein the term "centered" refers to the marking of the printout within the target position, disposed over the area 366, and thus, with equidistant separation from the first edge 381 and the second edge 389.

Print position drift may cause the position at which the printout area is marked to drift against the direction 699 of media movement vertically towards the upper edge 381. The position at which the printout area is marked may also drift vertically with the direction 699 of media movement towards the lower edge 389, horizontally and perpendicular, in either lateral direction, to the media movement direction 699, or over a diagonal or angular direction relative thereto.

Figure 3D:
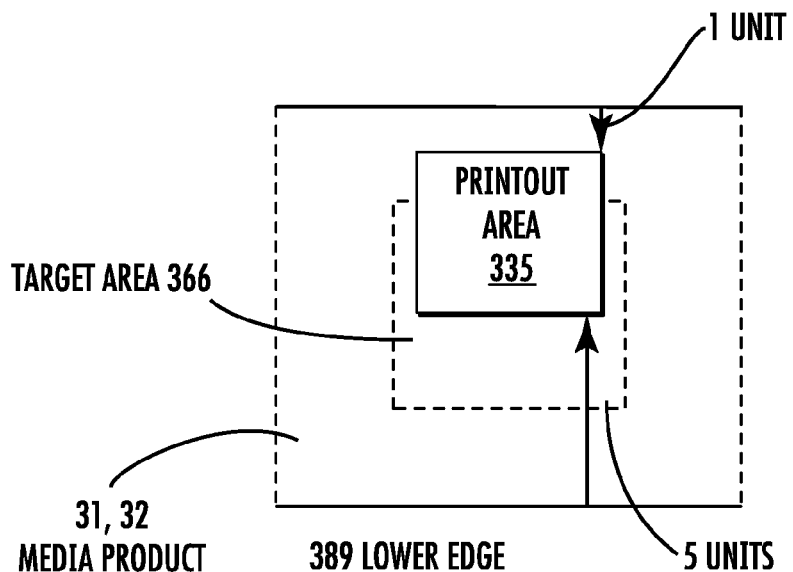
FIG. 3D depicts an example off-center printout on the print media product, according to an embodiment of the present invention.

For example, over an extended printing time, the position at which the printout area 355 is marked drifts vertically with respect to the target print area 366, towards the upper edge 381, and becomes off-center. FIG. 3D depicts an example off-center printout 399 on one or more of the print media products 31, 32. While the vertical displacement of the printout area 335 from the lower edge 389 has increased to five vertical displacement units in the off-center printout 399, its vertical displacement from the upper edge 381 has decreased to one unit.

In example embodiments of the present invention, the controller 144 adjusts the print mechanism 122 in response to an input 135, which based on an evaluation of the printouts marked on the first output group, is directed to ameliorating or eliminating the printout drift. A position at which the printouts are marked in the at least one subsequent output group is conformed spatially in relation to (e.g., with) the target position. Example embodiments thus re-center the printout 335 in relation to the target area 366.

Figure 4A:
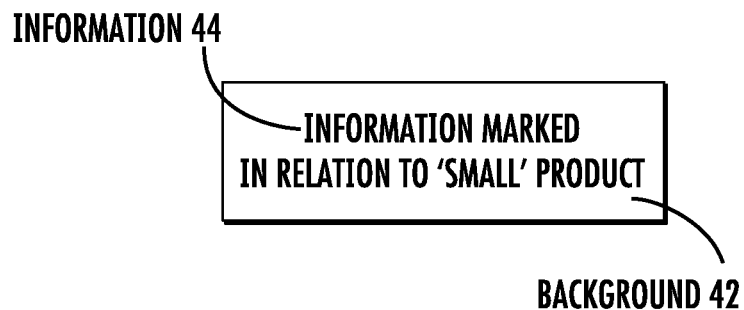
FIG. 4A depicts an example 'small' label type media product, according to an embodiment of the present invention.
Figure 4B:
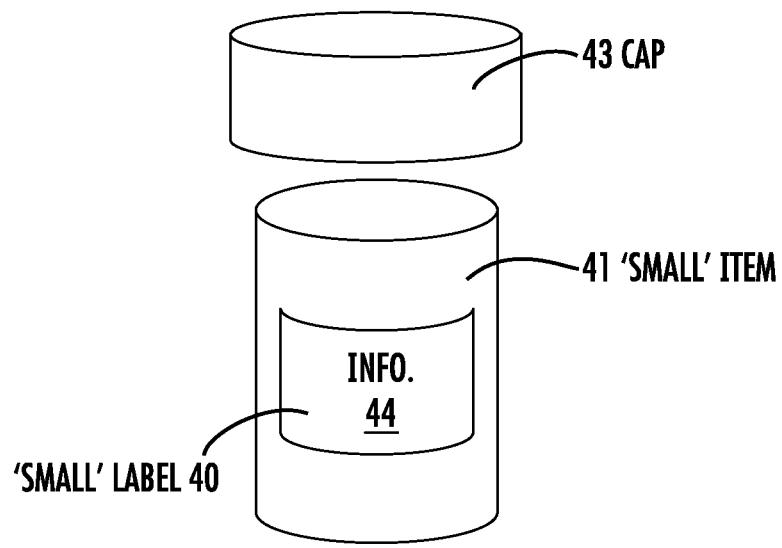
FIG. 4B depicts the example small label, in situ, according to an embodiment of the present invention.

The printed media product may comprise a plurality of labels. For example, each of the labels may comprise a 'small' label. FIG. 4A depicts an example 'small' label type media product 40, according to an embodiment of the present invention. The small label 40 comprises information 44 printed over a background 42. FIG. 4B depicts the example small label 40, in situ, according to an embodiment of the present invention. The small label 40 is applied to an item of a correspondingly or compatibly small size. For example, the small item 41 may comprise a medicine bottle (which is depicted with a compatible cap 43).

Figure 5A:
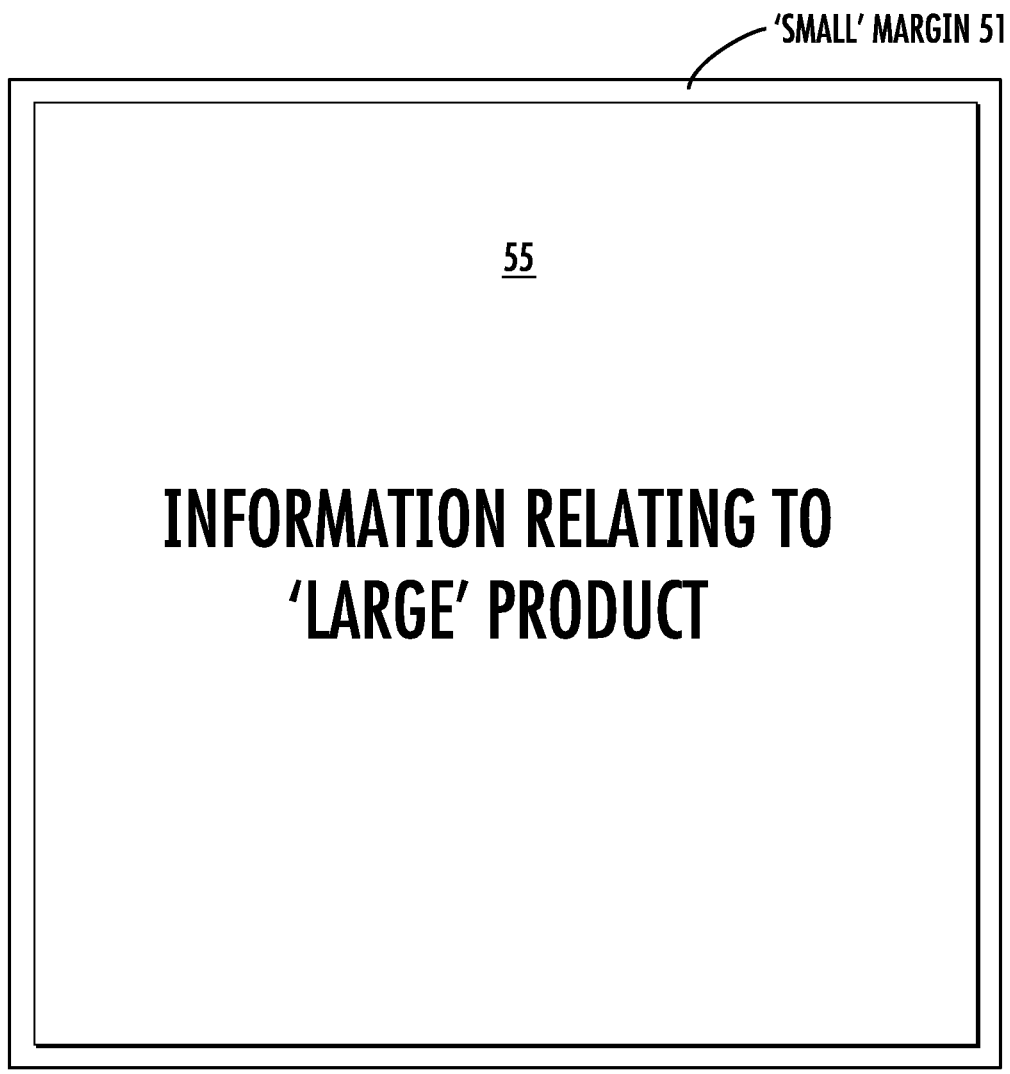
FIG. 5A depicts an example 'large' label type media product, according to an embodiment of the present invention.
Figure 5B:
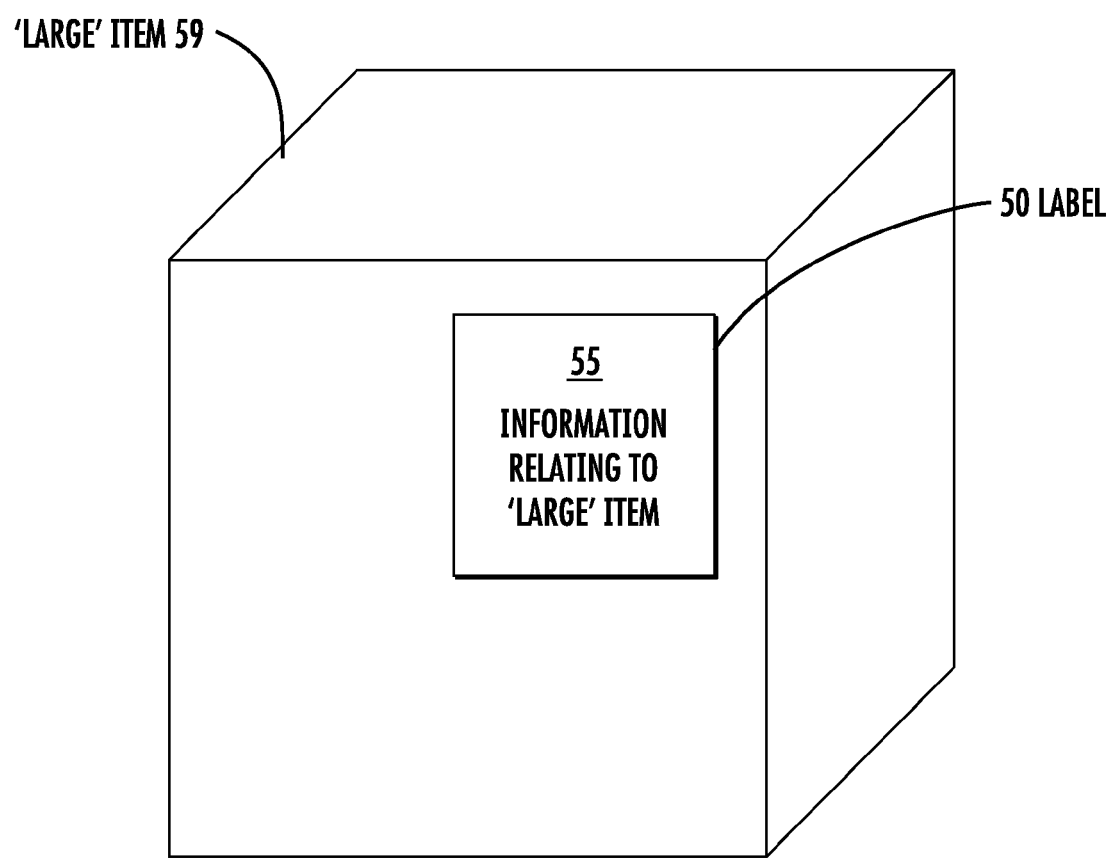
FIG. 5B depicts the example 'small' label, in situ, according to an embodiment of the present invention.

Alternatively, each of the labels may comprise a 'large' label. FIG. 5A depicts an example 'large' label type media product 50, according to an embodiment of the present invention. The large label comprises a 'small' margin 51 about the indicia, such as the printed information 55. FIG. 5B depicts the example 'large' label 50, in situ, according to an embodiment of the present invention. The large label 50 is applied to an item 59 of a correspondingly or compatibly large size, such as a box, crate or other package, or a piece of large machinery, such as a vehicle.

The indicia may comprise one or more symbols. For example, the symbols may comprise text based information, such as alphanumeric, and/or character or syllabary based text. The symbol may also (or alternatively) comprise ideographic, pictographic, or emblematic based graphics, images, or data patterns.

Figure 6A:
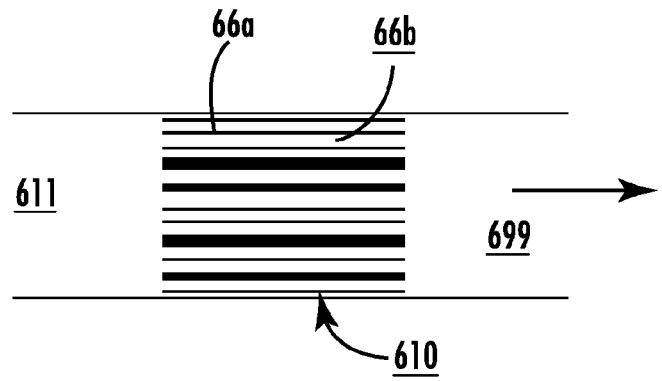
FIG. 6A depicts an example 1D 'drag' mode media product, according to an embodiment of the present invention.

FIG. 6A depicts an example 1D bar code pattern 610, according to an embodiment of the present invention. The 1D bar code symbol 610 is depicted as though printed in a 'ladder' or 'drag' mode on the print medium 611.

Figure 6B:
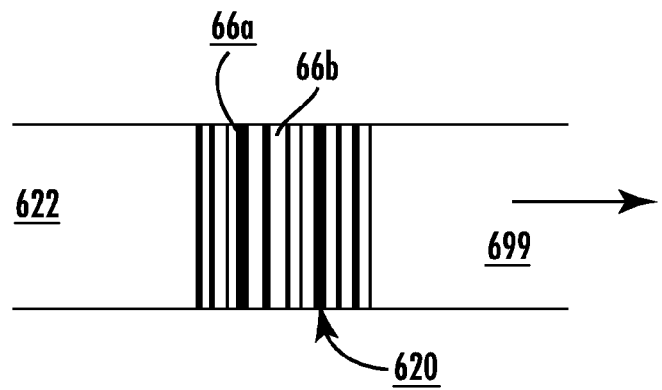
FIG. 6B depicts an example 1D 'picket fence' mode media product, according to an embodiment of the present invention.

FIG. 6B depicts another example 1D bar code pattern 620, according to an embodiment of the present invention. The 1D bar code symbol 622 is depicted as though printed in a 'picket fence' mode on a print medium 622.

The bar code symbols 610 and 620 each comprise a plurality of bar elements 66*a* and a plurality of space elements 68*b*. The space elements 68*b* are disposed in parallel with the bar elements 66*a*. In the drag mode, the bar code symbol 610 is printed parallel to the direction of printing 699. In the picket fence mode, the bar code symbol 620 is printed in a perpendicular orientation to the direction of printing 699.

The bar code symbols 610 and 620 may each comprise data patterns related to, for example, an International (or "European") Article Number and/or Universal Product Code (EAN/UPC symbology) pattern, PDF417 (ISO/EC-15438 related) pattern, which comprise four of the vertical bar like symbols 66*a* disposed over 17 of the horizontally disposed spacer symbols 68*b*), 1D dot code pattern, or other 1D symbols.

Figure 6C:
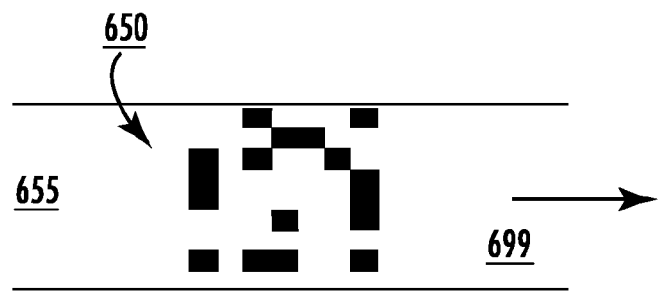
FIG. 6C depicts an example 2D media product, according to an embodiment of the present invention.

FIG. 6C depicts an example 2D matrix code pattern 650, according to an embodiment of the present invention. The 2D matrix code pattern 650 comprises a matrix of 2D graphic symbol parts, such as squares and other rectangle and polygons, printed on a print medium 655. The matrix data pattern 650 may comprise a 2D data pattern related to, for example, quick-response (QR) and/or Han Xin graphical or geometric data matrices, or other 2D symbols.

Figure 6D:
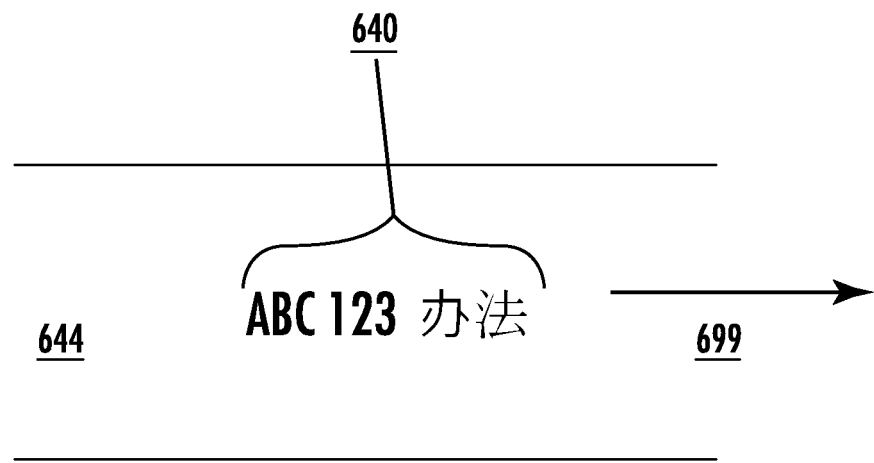
FIG. 6D depicts an example text based media product, according to an embodiment of the present invention.

FIG. 6D depicts an example text based code pattern 640, according to an embodiment of the present invention. The text based code pattern 640 comprises alphanumeric, character, or syllabary based text or other text related graphic symbol parts (e.g., OCR patterns), printed on a print medium 644. The code pattern 640 may comprise human readable and optical character recognition (OCR) readable symbol parts, such as numbers, letters, characters, and syllables printed on a print medium 644. The data pattern 640 may comprise a 2D data pattern related to, for example, OCR-B or OCR-A, or other 2D symbols.

The print media 611, 622, 644, and 655 each move longitudinally in a direction 699 of respective printing operations. The print media 611, 622, 644, and 655 may each comprise paper for receiving ink based markings, thermally sensitive paper, or plastic or other material. The print media 611, 622, 644, and 655 may be disposed in a web configuration, which is significantly longer than it is wide. The direction of printing 699 is parallel to a longitudinal axis of the print media 611, 622, 644, and 655, along which the media move.

The printing system 100 prints the symbols 610, 620, 640, and 650 on the respective web media 611, 622, 644, and 655 according to a printing process (e.g., method 20; FIG. 2A). An example embodiment may be implemented in which print logic generates a print command based on a reference pattern, to be printed centered in the target position. The print command and related reference pattern is used by a print driver to activate and energize print elements of the printing mechanism 112.

Responsive to the print command, for example, the activated and energized print mechanism 112 marks a part of the bar codes 610 and 620, matrix code 650 and/or text pattern 640 based on the reference pattern 305 and the media 611, 622, 644, and/or 655, respectively, advance in the direction 699. Each time that the media is advanced, a print driver activates elements of the print mechanism 112 for the marking of subsequent bar elements 66*a*, and spacing of parallel space elements 66*b*, onto a segment (e.g., portion) onto the media 611, 622, and 655, and/or the text pattern portions onto the medium 644.

As the printed portions of the media 611, 622, 644 and 655 advance through the print mechanism, the bulk printed media product 31 is produced. With 'linear' operable image heads, successive scan images of the printed element may be buffered sequentially into the scan memory area in a correspondence with the succession. The print command may be stored in a command related memory area.

Figure 8:
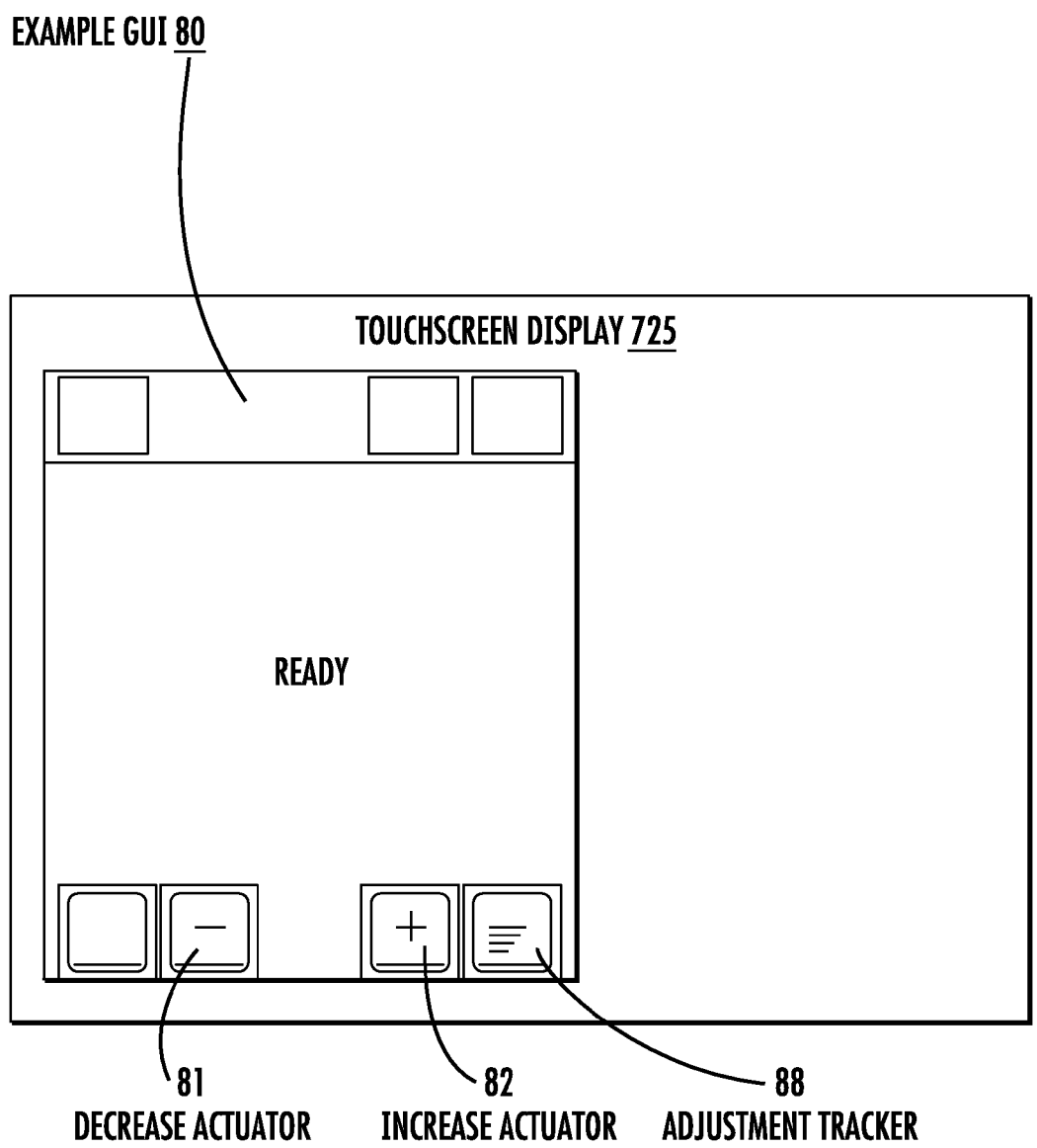
FIG. 8 depicts an example GUI, according to an embodiment of the present invention.

An example embodiment may be implemented for use with a graphical user interface (GUI), which may be rendered graphically and actuated haptically by an operator of the printing system 100. FIG. 8 depicts an example GUI 80, according to an embodiment of the present invention. The GUI is operable for inputting a signal relating to the evaluation of the printouts marked on the first output group. For example, the GUI 80 comprises a decrease actuator 81 and an increase actuator 82.

The increase actuator 82 is operable for inputting a command to the controller 144 relating to adjusting the position for the marking of the printout with an increase in the vertical distance to the upper edge of the print media product. The decrease actuator 82 is operable for inputting a command to the controller 144 relating to adjusting the position for the marking of the printout with a decrease in the vertical distance to the upper edge of the print media product.

The GUI 80 is further operable for displaying an indication 88 relating to tracking the adjusting of the print mechanism. For example, the indication may relate to a degree of adjustment corresponding to the adjusting of the print mechanism, such as steps of increase and/or steps of decrease in relation to the position of the print in relation to the upper edge of the print medium.

Figure 9:
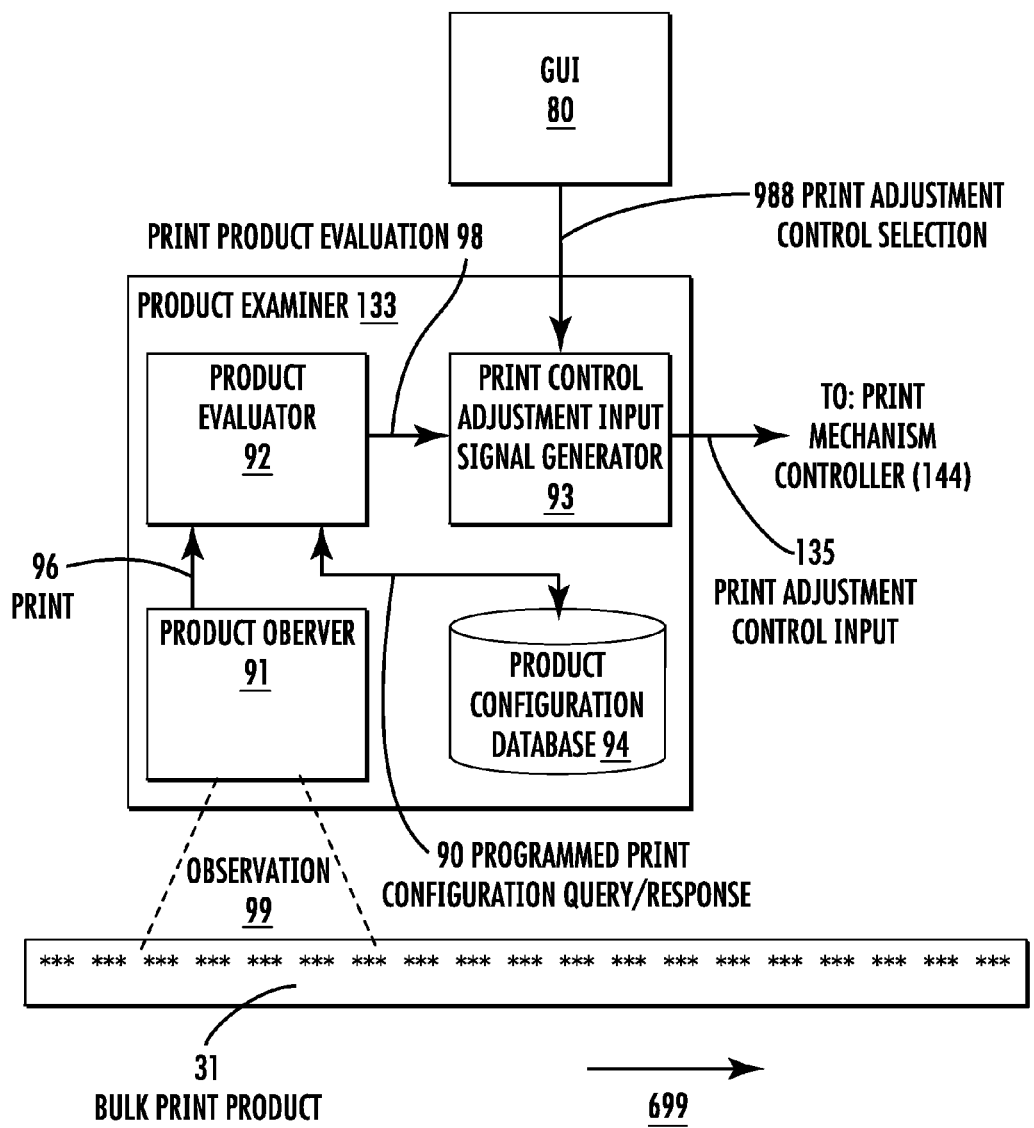
FIG. 9 depicts an example product examiner, according to an embodiment of the present invention.

The printing system may also comprise a product examiner 133 operable for examining the printouts of the bulk media product 31 (and/or the singulated media products 32) in relation to the marking of the printouts on the target position. FIG. 9 depicts an example product examiner 133, according to an embodiment of the present invention. The product examiner 133 may be configured in electronic or computer based hardware, software stored physically (e.g., electronically, optically, electromagnetically) in non-transitory computer readable storage media such as dynamic memory, flash memory, drives, caches, buffers, registers, latches, memory cells, or the like.

Figure 7:
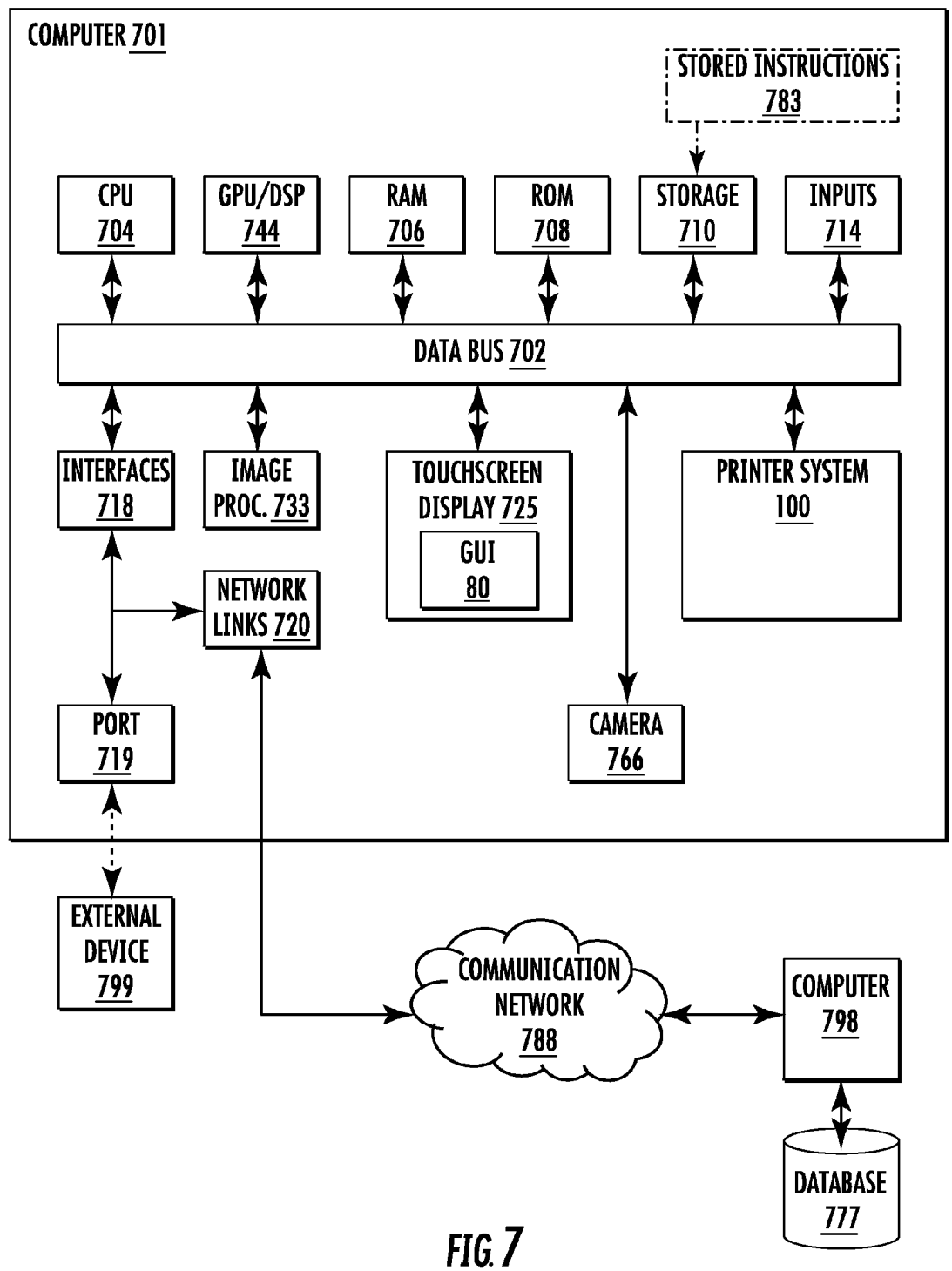
FIG. 7 depicts an example computer and network, with which an embodiment of the present invention may be practiced.

The product examiner 133 comprises a product observer 91. An example embodiment may be implemented in which the product observer 91 comprises a camera (e.g., camera 766; FIG. 7). The product observer 91 is operable for observing the printed media products as it moves in the print and feed direction 699 and providing a corresponding print product observation signal 96 to a print evaluator 92. The print evaluator 92 is operable for evaluating the print media products based on processing performed over the print product observation signal 92.

For example, upon receiving the print product observation signal 95, the product evaluator may query a print product configuration database 94 in relation thereto. For any given type, size, style, or other characteristic of the printout, the database 94 stores physically stores a corresponding configuration in a non-transitory computer readable storage medium.

In response to the query, the database 94 returns a configuration model 90 to the print evaluator 92. The returned configuration model 90 comprises a description related to the target position specified for the observed printouts, e.g., in relation to a vertical distance specified for the printouts from the upper edge of the print medium.

The product evaluator 92 may then compute an evaluation of the observed print products based on a comparison of characteristic of the printouts ascertained from the processing of the print product observation signal 96 to the returned configuration model 90. The product evaluator 92 outputs a print product evaluation signal 98 to a print control adjustment (PCA) input signal generator 93. Based on the print product evaluation signal 98, the PCA input signal generator 93 outputs the print adjustment control input 135 to the controller 144.

In an example embodiment, the GUI 80 may provide a print adjustment control selection 988 to the PCA input signal generator 93, which may augment, adjust, or over-ride the generation of the PCA input signal 98 in the generating of the print adjustment control input 135.

An example embodiment of the present invention relates to a method for printing an indicia on a graphic medium. The printing method may comprise a process of the printing system described above. FIG. 2A depicts a flowchart for an example printing method 20, according to an embodiment of the present invention.

The printing method comprises a step 21 for marking a plurality of printouts of the indicia at a target position on a substrate of the graphic medium. The target position comprises an area of a surface of the substrate of the graphic medium over which the marking is designated for each of the printouts.

In a step 22, a first output group of the marked printouts is produced (e.g., outputted). Upon the outputting of the first output group of the marked printouts, and continuous therewith (e.g., without any intermediary pause), at least one output group of the printouts is produced in a step 24. The at least one output group is marked subsequent to the first output group.

In a step 23, the marking of the printouts of the indicia is adjusted in response to an input related to an evaluation of the printouts marked on the first output group. The adjustment conforms a position at which the printouts are marked in the at least one subsequent output group, spatially, to the target position.

The graphic medium substrate comprises a first edge and a second edge. The second edge is parallel to, and opposite from the first edge. The area of the target position may comprise an upper bound separated by a first designated distance from the first edge of the graphic medium substrate, and/or a lower bound separated by a second designated distance from the first edge of the graphic medium substrate. The printing method may further comprise feeding the graphic medium substrate, e.g., to a print head, for the marking of the printouts of the indicia. The adjusting of the marking of the printouts may comprise a response to a change in a characteristic of the feeding of the graphic medium substrate.

Figure 2B:
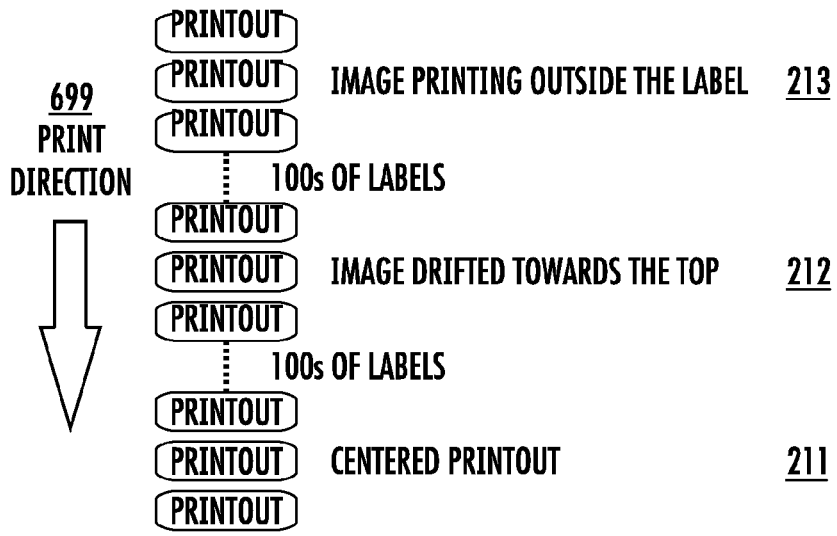
FIG. 2B depicts a printing showing an example of print position drift.
Figure 2C:
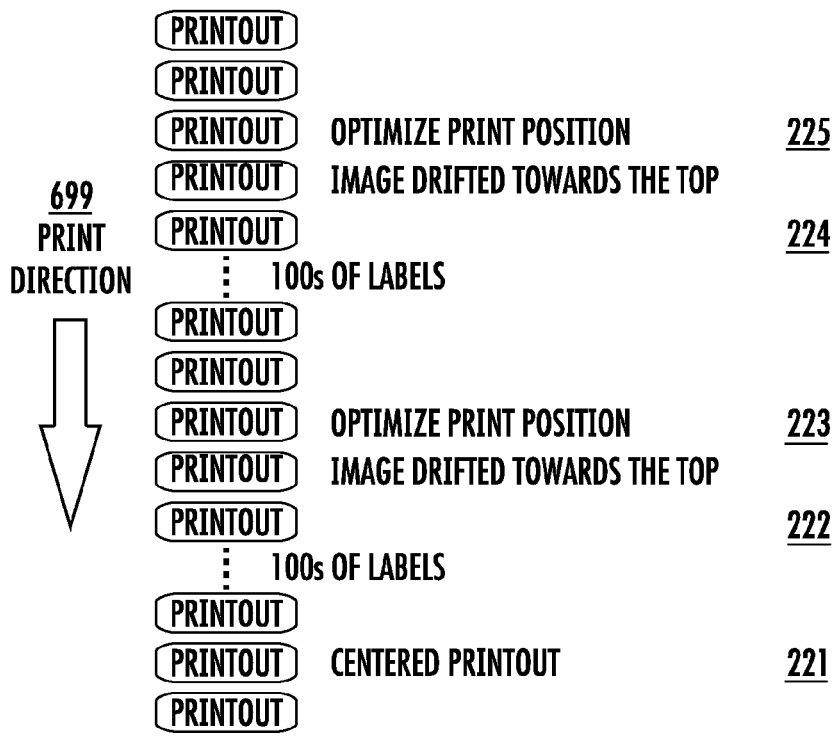
FIG. 2C depicts the example printing method in use and correcting the print position drift, according to an embodiment of the present invention.

FIG. 2B depicts a printing 210 showing an example of print position drift. Initially, the printed media product outputs 211 are centered (e.g., as shown in FIG. 3C) in relation to the target print position as the print products move in the direction 699 of printing and media feed. Over print time however, large numbers (e.g., hundreds) of print products may be produced and print position drift may occur. Thus, some of the print products 212 (or images thereof, e.g., observed by the product observer 91) may show a displacement towards the upper surface of the media substrate.

If the printout position drift remains uncorrected, subsequent printouts 213 may deteriorate to the point at which a portion of the printout is positioned outside of the media substrate and thus are not printed. The media products may fail to comply with a quality specification and/or may be substandard aesthetically and/or in relation to legibility of the printed indicia. Example embodiments of the present invention allow this condition to be corrected or ameliorated.

FIG. 2C depicts the example printing method in a use 220, which corrects the print position drift, according to an embodiment of the present invention. Initially, the printed media product outputs 221 are centered (e.g., as shown in FIG. 3C) in the target print position. Over the print time, large numbers (e.g., hundreds) of print products may be produced and print position drift may begin to develop.

However, example embodiments function at a moment 223 of the print time, without interrupting the printing or the movement of the print products in the direction 699, to adjust the position of the marking of the printout. Thus, the position at which the printouts are marked on the media substrate is realigned with the target print position.

Hundreds more media products may be printed as the print time continues and the print position drift may begin to develop again. The example embodiments function at a moment 225 of the print time, without interrupting the printing or the movement of the print products in the direction 699, to again adjust the position of the marking of the printout. Thus, the position at which the printouts are marked on the media substrate is realigned yet again with the target print position.

An example embodiment of the present invention relates to a media product comprising an indicia printed on a graphic medium. The media product is printed by the method 20 described above. For example, the media products printed by the method 20 may comprise any of the media products described herein with reference to FIG. 1, 2C, 3A, 3B, 3C, 4A, 4B, 5A, 5B, 6A, 6B, 6C, 6D, and/or FIG. 9, inclusive.

Example Computer and Network Platform.

An example embodiment may be implemented in which one or more components of the printing system 100 (e.g., product examiner 133) are configured in electronic or computer based hardware, software stored physically (e.g., electronically, optically, electromagnetically) in non-transitory computer readable storage media such as dynamic memory, flash memory, drives, caches, buffers, registers, latches, memory cells, or the like.

FIG. 7 depicts an example computer and network platform 700, with which an embodiment of the present invention may be practiced. The computer and network platform 700 comprises a first computer system ("computer") 701 and a data communication network 788.

The computer 701 comprises one or more components of the printer system 100 (e.g., product examiner 133). The computer 701 also comprises a touchscreen display 725. An example embodiment may be implemented in which the GUI 80 is rendered and actuated by the touchscreen display 725. The computer 701 may also comprise a camera 766. An example embodiment may be implemented in which the product observer 91 (FIG. 9) comprises the camera 766.

The network 788 may comprise a packet-switched data network operable based on transfer control and internetworking protocols (e.g., TCP/IP). The computer 701 may be coupled communicatively, and exchange data signals, over the data communication network 788 with at least a second computer 798, which is coupled communicatively with the data network 788.

The data network 788 may comprise a portion of one or more other networks and/or two or more sub-network ("subnet") components. For example, the data network 788 may comprise a portion of the internet and/or a particular wide area network (WAN). The network 788 may also comprise one or more WAN and/or local area network (LAN) subnet components. Portions of the data network 788 may be operable wirelessly and/or with wireline related means. The data network 788 may also comprise, at least in part, a communication network such as a digital telephone network.

An example embodiment may be implemented in which the computer 701 is operable for sending data to the computer 798 in relation to the operations of the print system 100 over the data network 788. The computer 798 may then store printer system operation related data in the database 777, from which it may be retrieved at a later time. The computer 701 may be operable for presenting a query to the computer 798 for input to the database 777, and for receiving corresponding replies, over the data communications network 788. An example embodiment may be implemented in which the product configuration database 94 is related to (e.g., comprises a component of, mirrors, or is mirrored by) the database 777.

The computer 701 comprises a plurality of electronic components, each of which is coupled to a data bus 702. The data bus 702 is operable for allowing each of the multiple, various electronic components of computer 701 to exchange data signals with each of the other electronic components.

The electronic components of the computer 701 may comprise integrated circuit (IC) devices, including one or more microprocessors. The electronic components of the computer 701 may also comprise other IC devices, such as a microcontroller, field-programmable gate array (FPGA) or other programmable logic device (PLD) or application-specific IC (ASIC).

The microprocessors may comprise a central processing unit (CPU) 704. The CPU 704 is operable for performing general data processing functions related to operations of the GRUI and other components of the computer 701. The electronic components of the computer 701 may also comprise one or more other processors 744.

For example, the other microprocessors may comprise a graphics processing unit (GPU) and/or digital signal processor (DSP) 704, which are each operable for performing data processing functions that may be somewhat more specialized than the general processing functions, as well as sometimes sharing some processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing may relate to imaging, image evaluation, graphics, dimension measurements, wireframe manipulations, coordinate system management, control, and other (e.g., mathematical, financial) information. One of the microprocessors may comprise an image processor 733, which is operable for processing the images and video feed from the camera 766.

The data processing operations comprise computations performed electronically by the image processor 333, CPU 704, and the DSP/GPU 744. The microprocessors may comprise components operable as an ALU, a FPU, and associated memory cells. The memory cells comprise non-transitory data storage media, which may be configured as caches (e.g., "L1," "L2"), registers, latches and/or buffers.

The memory cells are operable for storing data electronically in relation to various functions of the processor. A translational look-aside buffer (TLB) may be operable for optimizing efficiency of use of content-addressable memory (CAM) by the CPU 704, and/or the DSP/GPU 744, etc.

The computer 701 also comprises non-transitory computer readable storage media operable for storing data, e.g., electronically. For example, the computer readable storage media comprises a main memory 706, such as a random access memory (RAM) or other dynamic storage medium. The main memory 706 is coupled to data bus 702 for storing information and instructions, which are to be executed by the CPU 704.

The main memory 706 may also be used for storing temporary variables or other intermediate information during execution of instructions by the CPU 704. Other memories (represented in the present description with reference to the RAM 706) may be installed for similar uses by the DSP/GPU 744.

The printing evaluation system 300 further comprises a read-only memory (ROM) 708 or other static storage medium coupled to the data bus 702. The ROM 708 is operable for storing static information and instructions for use by the CPU 704. In addition to the RAM 706 and the ROM 708, the non-transitory storage media may comprise at least one data storage device 710. The data storage device 710 is operable for storing information and instructions and allowing access thereto.

The data storage device 710 may comprise a magnetic disk drive, flash drive, or optical disk drive (or other non-transitory computer readable storage medium). The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706.

The non-transitory storage media comprises instructions 783, which are stored (e.g., electronically, magnetically, optically, physically, etc.) in relation to software for programming, controlling, and/or configuring operations of the computer 701 and its components, including the printing system 100, the camera 766, the GUI 80, etc. The instructions 783 may also relate to the performance of one or more steps of the printing method 20 (FIG. 2A).

Instructions, programming, software, settings, values, and configurations, etc. related to the method 20, the printing system 100 and its components, and other operations of the computer 701 are stored (e.g., magnetically, electronically, optically, physically, etc.) by the storage medium 710, memory, etc.

The computer 701 comprises a user-interactive display configured as the touchscreen 725, which is operable as a combined display and GUI (e.g., GUI 80; FIG. 8). The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI 80 and touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen 725 and GUI 80, which cause corresponding local changes in electrical capacitance values proximate to the pressure application that are sensed by the conductor grids to effectuate a signal corresponding to the input.

The touchscreen display component 725 and GUI 80 are operable for rendering an interactive surface for receiving user inputs relating to the actuators 81 and 82 and for rendering the adjustment tracker 88 (FIG. 8). Images and video received from the camera 766 may also be presented on the display 725.

The touchscreen 725 may be implemented operably for rendering images over a heightened (e.g., high) dynamic range (HDR). The rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

Other display technologies may also (or alternatively) be used. For example, the display 725 may comprise an organic LED (OLED) array. The display 725 may also (or alternatively) comprise a display operable over a standard dynamic range (SDR), sometimes also referred to as a "low dynamic range" (LDR).

An input receiver 714 may comprise one or more electromechanical switches, which may be implemented as buttons, escutcheons, microelectromechanical sensors (MEMS) or other sensors, dual in-line package (DIP) switch, etc. The input receiver 714 may also comprise cursor and trigger controls such as a mouse, joystick, etc. and/or a keyboard. The keyboard may comprise an array of alphanumeric and/or ideographic, syllabary based keys operable for typing corresponding letters, number, and/or other symbols. The keyboard may also comprise an array of directional (e.g., "up/down," "left/right") keys, operable for communicating commands and data selections to the CPU 704 and for controlling movement of a cursor rendering over the touchscreen display 725.

The directional keys may be operable for presenting two (2) degrees of freedom of a cursor, over at least two (2) perpendicularly disposed axes presented on the display component of the touchscreen 725. A first 'x' axis is disposed horizontally. A second 'y' axis, complimentary to the first axis, is disposed vertically. Thus, the printing evaluation system 300 is thus operable for specifying positions over a representation of a geometric plane and/or other coordinate systems.

Execution of instruction sequences contained in the storage media 710 and main memory 706 cause the CPU 704 to perform processing related to general operations of the computer 701, the DSP/GPU 744 to perform various other processing operations, and the components of the printing system 100 to perform processing steps related to the example method 20 (FIG. 2A). Additionally or alternatively, hard-wired circuitry may be used in place of, or in combination with the software instructions. Thus, the computer 701 is not limited to any specific combination of circuitry, hardware, firmware, or software.

The term "computer readable storage medium," as used herein, may refer to any non-transitory storage medium that participates in providing instructions to the various processor components of the computer 701 for execution. Such a medium may take various forms including, but not limited to, non-volatile media, volatile media, and transmission media. Non-volatile media comprises, for example, configured/programmed active elements of the GRUI 41 (and other components of the control system 40) the CPU 704, the DSP/GPU 744, the non-transitory image related media 710, stored instructions 783, and other optical, electronic, or magnetic media. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at a radio frequency (RF), and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which the computer 701 can access, read, receive, and retrieve data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 788.

The printing system 100 can receive the data over the network 788 and use an infrared (IR), radio frequency (RF), or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transmitter/receiver (transceiver) means. The transmitter, receiver, and/or transceiver means may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. The communication interface is operable for providing a two-way (or more) data communication coupling to a network link 720, which may connect wirelessly over RF to the network 788. Wireless communication may also be implemented optically, e.g., at IR frequencies.

Signals may be exchanged via the interfaces 718 with an external device 799 (e.g., another computer or external storage device) through a compatible communication port 719. The input receiver 417 may provide signals to the GRUI 41 and other components of the control system 40 and the computer 701 via the port 719.

In any implementation, the communication interface 718 sends and receives electrical, electromagnetic, or optical signals that carry digital data streams representing various types of information. The network link 720 provides data communication through the network 788 to other data devices. The input receiver 417 may provide signals to the printer system 100 and other components of the computer 701 via the network links 720 and/or the data communications network 788.

The network 788 may use one or more of electrical, electromagnetic, and/or optical signals carrying digital data streams. The signals sent over the network 788 and through the network link 720 and communication interface 718 carry the digital data to and from the printing evaluation system 300. The printing evaluation system 300 can send messages and receive data, including program code, through the network 788, network link 720, and communication interface 718.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;

U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;

U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILEPHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FOR- WARD DATA HANDLING BY ENCODED INFORMATION READING TERMINALS filed Mar. 2, 2015 (Sevier);
U.S. patent application Ser. No. 29/519,017 for SCANNER filed Mar. 2, 2015 (Zhou et al.);
U.S. patent application Ser. No. 14/405,278 for DESIGN PATTERN FOR SECURE STORE filed Mar. 9, 2015 (Zhu et al.);
U.S. patent application Ser. No. 14/660,970 for DECODABLE INDICIA READING TERMINAL WITH COMBINED ILLUMINATION filed Mar. 18, 2015 (Kearney et al.);
U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);
U.S. patent application Ser. No. 14/662,922 for MULTIFUNCTION POINT OF SALE SYSTEM filed Mar. 19, 2015 (Van Horn et al.);
U.S. patent application Ser. No. 14/663,638 for VEHICLE MOUNT COMPUTER WITH CONFIGURABLE IGNITION SWITCH BEHAVIOR filed Mar. 20, 2015 (Davis et al.);
U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);
U.S. patent application Ser. No. 14/669,280 for TRANSFORMING COMPONENTS OF A WEB PAGE TO VOICE PROMPTS filed Mar. 26, 2015 (Funyak et al.);
U.S. patent application Ser. No. 14/674,329 for AIMER FOR BARCODE SCANNING filed Mar. 31, 2015 (Bidwell);
U.S. patent application Ser. No. 14/676,109 for INDICIA READER filed Apr. 1, 2015 (Huck);
U.S. patent application Ser. No. 14/676,327 for DEVICE MANAGEMENT PROXY FOR SECURE DEVICES filed Apr. 1, 2015 (Yeakley et al.);
U.S. patent application Ser. No. 14/676,898 for NAVIGATION SYSTEM CONFIGURED TO INTEGRATE MOTION SENSING DEVICE INPUTS filed Apr. 2, 2015 (Showering);
U.S. patent application Ser. No. 14/679,275 for DIMENSIONING SYSTEM CALIBRATION SYSTEMS AND METHODS filed Apr. 6, 2015 (Laffargue et al.);
U.S. patent application Ser. No. 29/523,098 for HANDLE FOR A TABLET COMPUTER filed Apr. 7, 2015 (Bidwell et al.);
U.S. patent application Ser. No. 14/682,615 for SYSTEM AND METHOD FOR POWER MANAGEMENT OF MOBILE DEVICES filed Apr. 9, 2015 (Murawski et al.);
U.S. patent application Ser. No. 14/686,822 for MULTIPLE PLATFORM SUPPORT SYSTEM AND METHOD filed Apr. 15, 2015 (Qu et al.);
U.S. patent application Ser. No. 14/687,289 for SYSTEM FOR COMMUNICATION VIA A PERIPHERAL HUB filed Apr. 15, 2015 (Kohtz et al.);
U.S. patent application Ser. No. 29/524,186 for SCANNER filed Apr. 17, 2015 (Zhou et al.);
U.S. patent application Ser. No. 14/695,364 for MEDICATION MANAGEMENT SYSTEM filed Apr. 24, 2015 (Sewell et al.);
U.S. patent application Ser. No. 14/695,923 for SECURE UNATTENDED NETWORK AUTHENTICATION filed Apr. 24, 2015 (Kubler et al.);
U.S. patent application Ser. No. 29/525,068 for TABLET COMPUTER WITH REMOVABLE SCANNING DEVICE filed Apr. 27, 2015 (Schulte et al.);
U.S. patent application Ser. No. 14/699,436 for SYMBOL READING SYSTEM HAVING PREDICTIVE DIAGNOSTICS filed Apr. 29, 2015 (Nahill et al.);
U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);
U.S. patent application Ser. No. 14/702,979 for TRACKING BATTERY CONDITIONS filed May 4, 2015 (Young et al.);
U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);
U.S. patent application Ser. No. 14/707,037 for SYSTEM AND METHOD FOR DISPLAY OF INFORMATION USING A VEHICLE-MOUNT COMPUTER filed May 8, 2015 (Chamberlin);
U.S. patent application Ser. No. 14/707,123 for APPLICATION INDEPENDENT DEX/UCS INTERFACE filed May 8, 2015 (Pape);
U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION READING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGUMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);
U.S. patent application Ser. No. 29/528,590 for ELECTRONIC DEVICE filed May 29, 2015 (Fitch et al.);
U.S. patent application Ser. No. 29/528,890 for MOBILE COMPUTER HOUSING filed Jun. 2, 2015 (Fitch et al.);
U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);
U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA-READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention are thus described in relation to a system and method for printing media products. An example embodiment of the present invention relates to a system for printing an indicia on a graphic medium. The printing system comprises a print mechanism and a controller. The print mechanism is operable for marking a plurality of printouts of the indicia at a target position on the graphic medium, and for outputting a corresponding printed media product. The printed media product comprises a first output group of the marked printouts, and continuous with the output of the first group of printouts, at least one output group of the printouts marked subsequent to the first output group. The controller is operable for adjusting the print mechanism in response to an input related to an evaluation of the printouts marked on the first output group. The adjusting of the print mechanism conforms a position at which the printouts are marked in the at least one subsequent output group spatially to the target position.

Example embodiments of the present invention are thus useful, for example, in printing small labels, and labels upon which the text, barcodes, and/or other graphics or indicia that fill most of the area of the label, which has a small margin. Example embodiments of the present invention may also thus reduce waste related to improper, non-conforming, or otherwise defective labels, and thus avoid associated delays and corresponding expense. Further, example embodiments of the present invention may thus prevent or reduce delays in the print jobs and associated printing system downtime, diversions of operator attention ore administrator intervention, and costs associated with both.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed is:

1. A system for printing an indicia on a graphic medium, the printing system comprising:
   a print mechanism operable to mark a plurality of printouts of the indicia at a target position on the graphic medium and for outputting a printed media product, the printed media product comprising a first output group of the marked printouts, and continuous with the output of the first group of printouts, at least one output group of the printouts marked subsequent to the first output group;
   a product observer operable to observe a spatial relationship between the printouts of the indicia and the graphic medium, and output a print adjustment control input; and
   a controller operable to adjust the print mechanism in response to receiving the print adjustment control input, wherein the adjusting conforms a position at which the printouts are marked in the at least one subsequent output group spatially with the target position.

2. The system as described in claim 1 wherein the target position comprises an area of a surface of a substrate of the graphic medium over which the marks are designated for each of the printouts.

3. The system as described in claim 2 wherein the graphic medium substrate comprises a first edge and a second edge, the second edge parallel to and opposite from the first edge, and wherein the area of the target position comprises one or more of:
- an upper bound separated by a first designated distance from the first edge of the graphic medium substrate; or
- a lower bound separated by a second designated distance from the first edge of the graphic medium substrate.

4. The system as described in claim 2, further comprising a feed mechanism operable to supply the graphic medium substrate to the print mechanism.

5. The system as described in claim 4 wherein the adjusting of the print mechanism comprises a response to a change in an operating characteristic of the feed mechanism.

6. The system as described in claim 1 wherein the printed media product comprises a plurality of labels.

7. The system as described in claim 6 wherein each of the labels comprises a 'small' label for application with a correspondingly small item.

8. The system as described in claim 6 wherein each of the labels comprises a 'large' label, the large label comprising a 'small' margin about the indicia and for application with a correspondingly large item.

9. The system as described in claim 1 wherein the indicia comprises a symbol.

10. The system as described in claim 9 wherein the symbol comprises one or more of alphanumeric, character, or syllabary based text, or ideographic, pictographic, or emblematic based graphics.

11. The system as described in claim 1 wherein the indicia comprises one or more of a one dimensional (1D) or a two dimensional (2D) data pattern.

12. The system as described in claim 1 further comprising a graphical user interface (GUI) operable to manually output the print adjustment control input signal to the controller.

13. The system as described in claim 12 wherein the GUI is further operable to display an indication relating to the adjusting of the print mechanism.

14. The system as described in claim 13 wherein the displayed indication relates to a degree of adjustment corresponding to the adjusting of the print mechanism.

15. The system as described in claim 1 wherein the print medium substrate comprises a thermally sensitive material, and wherein the print mechanism comprises a thermal printhead wherein the marking the plurality of printouts of the indicia comprises a thermal marking.

16. The system as described in claim 1 wherein the print medium substrate comprises one or more of a paper material or a plastic material, and wherein the marking the plurality of printouts of the indicia comprises marking the print medium substrate with a compatible marking material.

17. A method for printing an indicia on a graphic medium, the printing method comprising the steps of:
- marking a plurality of printouts of the indicia at a target position on a substrate of the graphic medium, the target position comprising an area of a surface of the substrate of the graphic medium over which the marking is designated for each of the printouts;
- outputting a first output group of the marked printouts;
- upon the outputting of the first output group of the marked printouts and in continuity therewith, outputting at least one output group of the printouts marked subsequent to the first output group;
- observing a spatial relationship between the printouts of the indicia and the graphic medium with an automated product observer that outputs a print adjustment control input; and
- adjusting the marking of the printouts of the indicia in response to the print adjustment control input, wherein the adjusting step conforms a position at which the printouts are marked in the at least one subsequent output group spatially to the target position.

18. The method as described in claim 17 wherein the graphic medium substrate comprises a first edge and a second edge, the second edge parallel to and opposite from the first edge, and wherein the area of the target position comprises one or more of:
- an upper bound separated by a first designated distance from the first edge of the graphic medium substrate; or
- a lower bound separated by a second designated distance from the first edge of the graphic medium substrate.

19. The method as described in claim 17, further comprising feeding the graphic medium substrate for the marking of the printouts of the indicia wherein the adjusting of the marking of the printouts comprises a response to a change in a characteristic of the feeding of the graphic medium substrate.

* * * * *